United States Patent
Lin et al.

(10) Patent No.: US 9,490,914 B2
(45) Date of Patent: Nov. 8, 2016

(54) ELECTRONIC DEVICE AND ITS WIRELESS NETWORK COMMUNICATION METHOD

(71) Applicant: Acer Incorporated, New Taipei (TW)

(72) Inventors: Shih-Hao Lin, New Taipei (TW); Wen-Cheng Hsu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 134 days.

(21) Appl. No.: 14/484,440

(22) Filed: Sep. 12, 2014

(65) Prior Publication Data
US 2015/0201424 A1 Jul. 16, 2015

(30) Foreign Application Priority Data
Jan. 13, 2014 (TW) ............... 103101117 A

(51) Int. Cl.
*H04B 11/00* (2006.01)
(52) U.S. Cl.
CPC ..................... *H04B 11/00* (2013.01)
(58) Field of Classification Search
CPC ....... H04W 72/04; H04W 72/10; H04Q 7/20
See application file for complete search history.

(56) References Cited

U.S. PATENT DOCUMENTS

| | | | |
|---|---|---|---|
| 2009/0189739 A1* | 7/2009 | Wang | H04Q 9/00 340/10.1 |
| 2014/0254810 A1* | 9/2014 | Abramsky | H04R 3/00 381/58 |

\* cited by examiner

*Primary Examiner* — Alvin Zhu
(74) *Attorney, Agent, or Firm* — McClure, Qualey & Rodack, LLP

(57) ABSTRACT

A wireless network connection method is provided, in which a first priority level of a first electronic device is determined according to the performance of the first electronic device. A first identification sound of a frequency band of a total frequency band is transmitted, and the frequency band corresponds to the first priority level. A second identification sound from a second electronic device is received. A second priority level of the second electronic device is determined according to the second identification sound. The second priority level is compared with the first priority level. When the second priority level is higher than or equal to the first priority level, the transmission of the first identification sound is stopped. When the second priority level is lower than the first priority level, the transmission of the first identification sound is kept until a host is assigned to implement wireless internet connections.

17 Claims, 8 Drawing Sheets

ELECTRONIC DEVICE AND ITS WIRELESS NETWORK COMMUNICATION METHOD

CROSS REFERENCE TO RELATED APPLICATIONS

This Application claims priority of Taiwan Patent Application No. 103101117, filed on Jan. 13, 2014, the entirety of which is incorporated by reference herein.

BACKGROUND OF THE INVENTION

1. Field of the Invention

The present invention relates to a communication technology, and in particular to a wireless communication method of an electronic device and its electronic device.

2. Description of the Related Art

As portable electronic devices become more popular, modern users increasingly depend on wireless network connections. The current wireless network technology includes long-distance wireless connection technologies and short-distance wireless connection technologies. Long-distance wireless connection technologies include Wi-Fi, GPRS (General Packet Radio Service) and CDMA (Code Division Multiple Access). Short-distance wireless connection technologies include Wi-Fi Direct, Bluetooth and NFC (Near Field Communication).

However, the above wireless connections have to be supported by particular hardware, and could be implemented as connections between one-to-one devices or one-to-many devices. Before the user transmits or shares data, the wireless connection or wireless transmission between different electronic devices must be developed, which takes time and is not convenient. Therefore, a more efficient wireless transmission method is needed for users to transmit and share data more easily.

BRIEF SUMMARY OF THE INVENTION

The present invention provides a wireless network communication method utilized for a first electronic device. The wireless network communication method includes determining a first priority level of the first electronic device according to performance of the first electronic device; transmitting a first identification sound which belongs to a band of a total band, wherein the band corresponds to the first priority level; receiving a second identification sound transmitted by a second electronic device; and comparing the second priority level and the first priority level, stopping transmission of the first identification sound when the second priority level is higher than or equal to the first priority level, and continuing transmission of the first identification sound until a host is set to implement a wireless network communication when the second priority level is lower than the first priority level.

The present invention provides an electronic device utilized for wireless network communication. The electronic device includes control circuitry, audio transmission circuitry, audio receiving circuitry and connection circuitry. The control circuitry is utilized to determine a first priority level of the electronic device according to performance of the electronic device, divide a total frequency band into at least one band and determine one of the at least one band for corresponding to the first priority level. The audio transmission circuitry is utilized to transmit a first identification sound corresponding to the band. The audio receiving circuitry is utilized to receive a second identification sound transmitted by a first external electronic device. The control circuitry determines a second priority level of the first external electronic device according to the second identification sound, compares the second priority level and the first priority level, stops the transmission of the first identification sound when the second priority level is higher than or equal to the first priority level, and keeps the transmission of the first identification sound until a host is set to implement a wireless network communication when the second priority level is lower than the first priority level.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
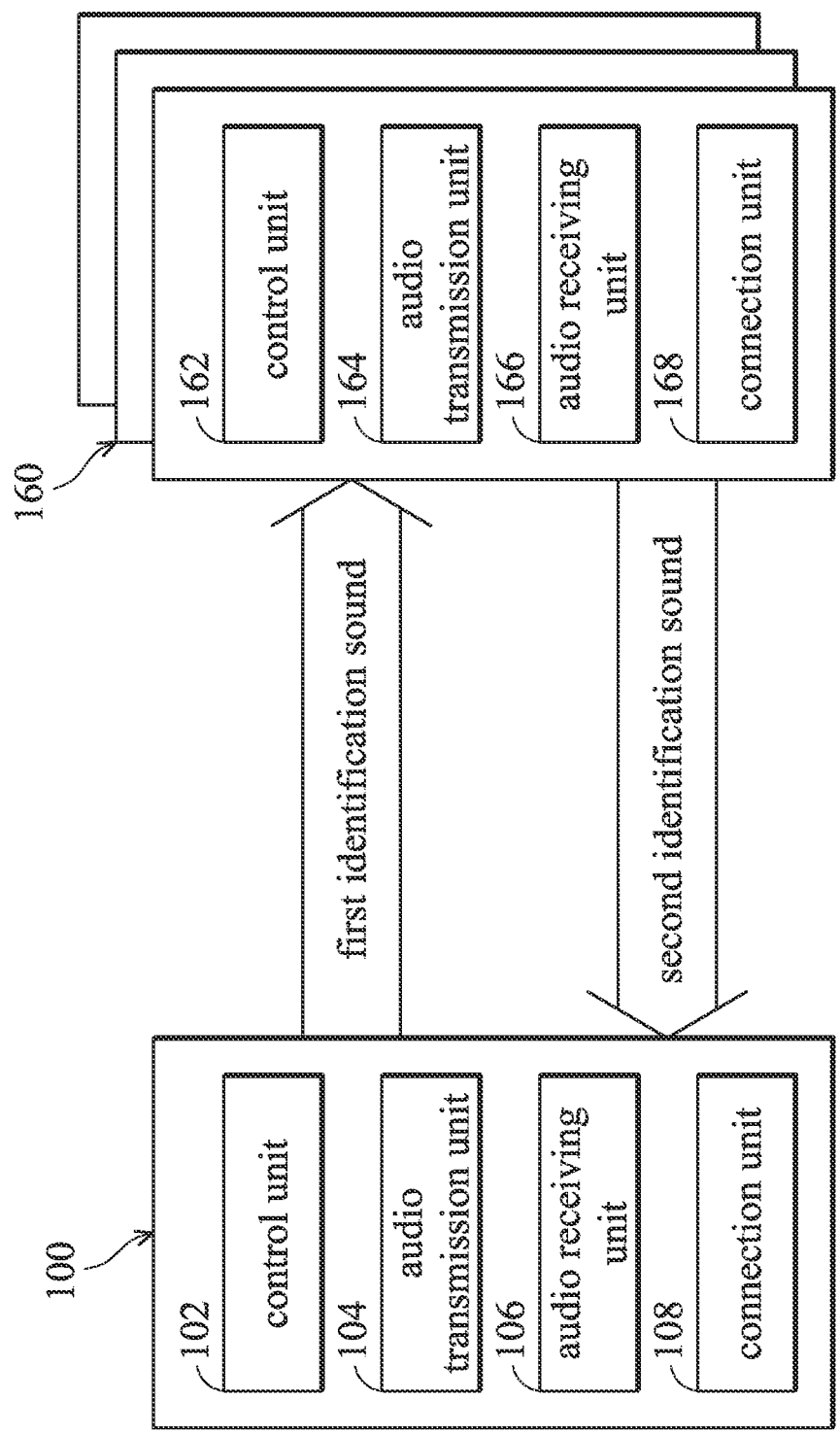
FIG. 1 is a schematic diagram of the first electronic device and the second electronic device of the present invention.

FIG. 1 is a schematic diagram of the first electronic device 100 and the second electronic device 160 of the present invention. The first electronic device 100 includes control circuitry 102, audio transmission circuitry 104, audio receiving circuitry 106 and connection circuitry 108. The second electronic device 160 includes a control circuitry 162, an audio transmission circuitry 164, an audio receiving circuitry 166 and a connection circuitry 168. The first electronic device 100 and the second electronic device 160 could be devices which provide wireless network service and network connection, such as a network server, a smart phone, a laptop computer or a tablet computer, and are not limited thereto. In the embodiments of the present invention, the second electronic device 160 could be an external electronic device of the first electronic device 100. In the embodiments of the present invention, each type of circuitry could be composed of hardware components including a chip, a controller, a storage device and/or other necessary circuits.

In one embodiment, the control circuitry 102 determines a first priority level of the first electronic device 100 according to the performance of the first electronic device 100, and divides the total frequency band into a plurality of frequency bands, and then determines one of the frequency bands in accordance with the first priority level. In other words, different priority levels correspond to different frequency bands. For example, higher priority levels correspond to frequency bands of higher frequencies. The control circuitry 102 could include a digital signal processor (DSP), a microcontroller (MCU), a central-processing unit (CPU) or a plurality of parallel processors relating the parallel processing environment.

The audio transmission circuitry 104 transmits the first identification sound corresponding to the determined frequency band to the second electronic device 160. As shown in FIG. 1, in one embodiment, the audio transmission circuitry 104 transmits the first identification sound to at least one second electronic device 160. Afterwards, the audio receiving circuitry 106 receives the second identification sound transmitted from the at least one second electronic device 160. The connection circuitry 108 could be a wireless communication chip or a related component in accordance with the wireless network connection method of the present invention to develop wireless network communication based on a communication protocol. For example, the communication protocol could constitute GSM, GPRS, EDGE, UMTS, W-CDMA, CDMA2000, TD-CDMA, Bluetooth, NFC, WiFi, WiMAX, LTE, LTE-A or TD-LTE.

Specifically, the control circuitry 102 determines a second priority level of the second electronic device 160 according to the second identification sound, and compares the second priority level of the second electronic device 160 and the first priority level of the first electronic device 100. When the second priority level is higher than or equal to the first priority level, the audio transmission circuitry 104 stops transmitting the first identification sound. When the second priority level is lower than the first priority level, the audio transmission circuitry 104 keeps transmitting the first identification sound until the control circuitry 102 sets a host to perform or implement the wireless network connection. In one embodiment, when only one of the first electronic device 100 and the second electronic devices 160 transmits the first identification sound or the second identification sound, the control circuitry 102 sets the one transmitting the first identification sound or the second identification sound as the host, and sets the one not transmitting the first identification sound or the second identification sound as a client which connects to a wireless network through the host.

In another embodiment, after the control circuitry 102 sets the electronic device transmitting the first identification sound or the second identification sound as the host, the connection circuitry of the host transmits a media access control (MAC) address on each sub-frequency band to each of the clients for developing a group connection between the host and each of the clients. Specifically, after being set as the host, the control circuitry of the host could initiate the function of the software AP, and the connection circuitry of the host transmits the mac address to each of the clients. When the connection circuitry of the client receives the mac address, it could connect to the software AP of the host through the mac address to implement the wireless network connection. Afterwards, the group connection of wireless network transmission between the host and each client could be automatically developed.

Therefore, the first electronic device 100 and the second electronic device 160 could transmit its own identification sound and receive the identification sound from other electronic devices, and compare the performance of its own electronic device with that of other electronic devices through the priority level indicated by the identification sound. The better performing electronic device keeps the transmission of the identification sound, and the electronic device with poor performance stops the transmission of the identification sound. After a period of time, only the electronic device with the highest performance still keeps transmitting the identification sound. Based on this method, the electronic device with the highest performance could be found among the first electronic device 100 and at least one second electronic device 160 to become the host for implementing the wireless network connection. Other electronic devices without the best performance are set as clients and connect to the wireless network through the host. Therefore, through the wireless network connection method of the present invention, the first electronic device 100 and at least one second electronic device 160 could automatically find the electronic device with the best performance to become the host, and initiate the software AP for connecting to the wireless network. In this case, users do not need to find out the electronic device with the best performance on their own, and set the wireless network by themselves.

Figure 2:
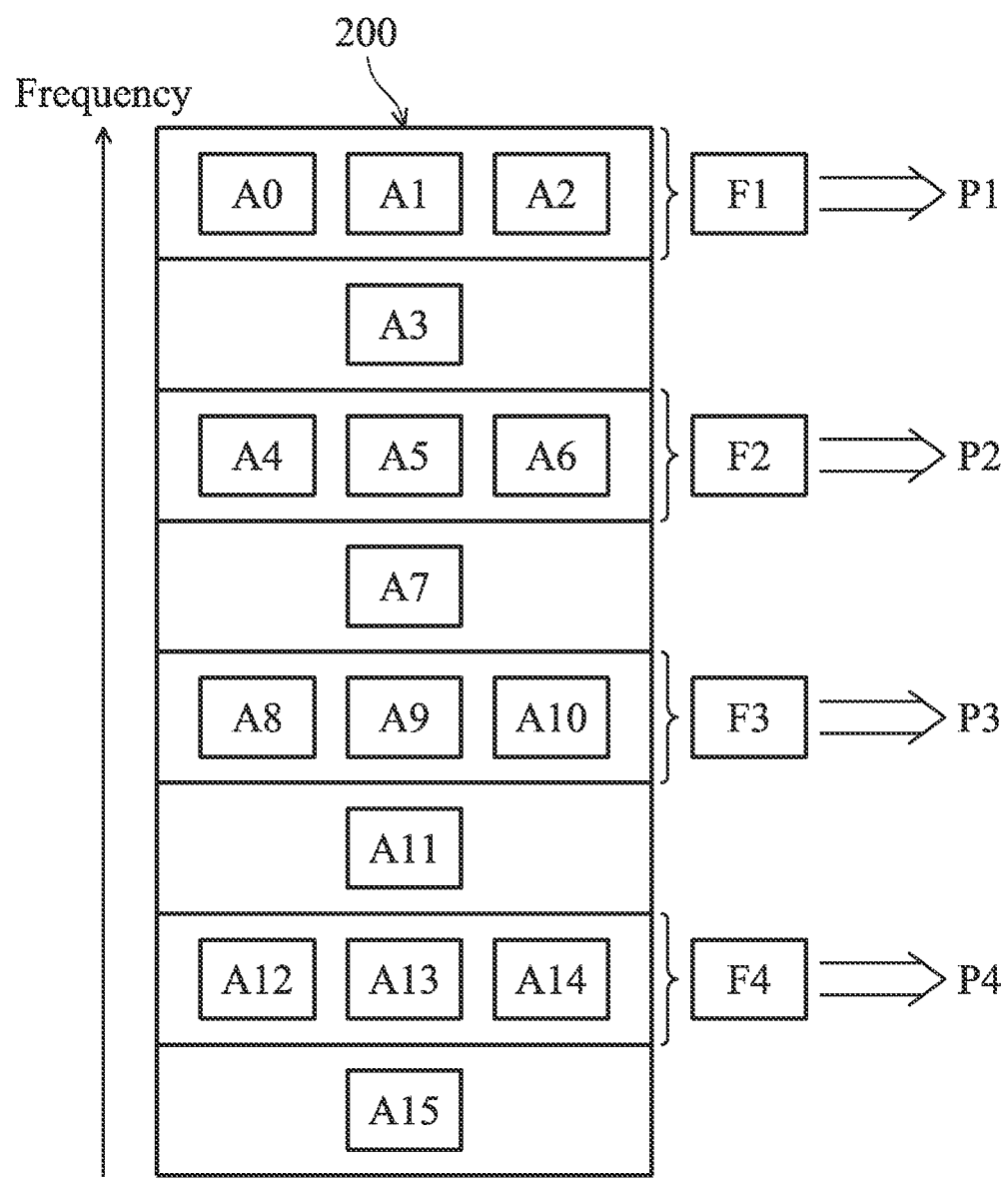
FIG. 2 is a schematic diagram of the allocation of frequency bands according to priority levels of the present invention.

FIG. 2 is a schematic diagram of allocating frequency bands according to priority levels of the present invention. As shown in FIG. 2, in one embodiment, the total frequency band 200 includes a plurality of sub-frequency bands A0 to A15. The sub-frequency bands A0, A1 and A2 belong to the frequency band F1. The sub-frequency bands A4, A5 and A6 belong to the frequency band F2. The sub-frequency bands A8, A9 and A10 belong to the frequency band F3. The sub-frequency bands A12, A13 and A14 belong to the frequency band F4. In other words, the total frequency band 200 includes four frequency bands F1 to F4, and each of the frequency bands F1 to F4 respectively includes three frequency bands. In one embodiment, F1 is the frequency band with the highest frequency, and A0 is the sub-frequency band with the highest frequency. After the control circuitry 102 determines the first priority level according to the performance of the first electronic device 100, the first identification sound would be transmitted on the corresponding frequency band according to the priority level. For example, if the control circuitry 102 determines that the first priority level of the first electronic device 100 is P1, it then utilizes the frequency band F1 corresponding to the first priority level P1 to transmit the first identification sound. If the control circuitry 102 determines that the first priority level is P4, it then utilizes the frequency band F4 to transmit the first identification sound. Therefore, when the second electronic device 160 receives the first identification sound, it could identify the first priority level of the first electronic device 100 and compare the first priority level to the second priority level.

In one embodiment, the frequency range of the total frequency band 200 is about 18000 Hz to 20000 Hz, and the bandwidth of each sub-frequency is about 100 Hz. The reason for setting the frequency range of the total frequency band 200 on 18000 Hz to 20000 Hz is that such a frequency range could be transmitted by a normal speaker but not be heard by most users. Therefore, when the first electronic device 100 and the second electronic device 160 transmit identification sounds within this frequency range, the identification sounds could be transmitted and received effectively without disturbing the user.

It should be noted that the first identification sound includes a service set identifier (SSID) to identify the details about performance of the first electronic device 100, such as communication protocol type, network connection capability, device type, power mode and/or battery status. In one embodiment, the control circuitry 102 calculates the values of each of the above details about performance according to the performance of the first electronic device 100, and edits it to become the SSID consisting of bits. The setting and editing methods of the SSID will be described in detail below.

Table 1 is an illustrative diagram of the SSID of the electronic device according to an embodiment of the present invention.

TABLE 1

| Character | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Value | 2 | 4 | 6 | 8 | 2 | 4 |  | 0 | 0 | 0 | 2 | 1 | 0 | 4 | 1 | 0 |  | 1 |
| Function | L | i | n | k | u | s | — | A | A | A | A | B | B | C | D | E | — | F |
| Length |  |  | 6 |  |  |  |  |  | 1 |  | 4 |  | 1 | 2 |  | 1 | 1 | 1 |

| | Character | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|
| | Value | 3 | 5 | 7 | 9 | 1 | 3 | 5 | 7 | 9 | 1 | 3 | 5 | 7 | 9 |
| | Function | F | F | F | F | F | F | F | F | F | F | F | F | F | F |
| | Length |  |  |  |  |  |  | 15 |  |  |  |  |  |  |  |

As shown in Table 1, the first electronic device 100 could have SSID of 32 bytes, and the function column is utilized to indicate the function of its corresponding bytes. For example, the first to sixth bytes (with function column of "Linkus") could be a specific SSID in accordance with the wireless network connection method of the embodiment of the present invention. The eighth to eleventh bytes (with function column of "A") could be utilized to indicate the type of communication protocol used by the electronic device 100. For example, "0001" indicates the e-commerce card (vCard), "0002" indicates the file swap, "0003" indicates matching the unknown subscriber, etc. The twelvth to thirteenth bytes (with function column of "B") could be utilized to indicate the type of the device. For example, "01" indicates smart phone, "02" indicates tablet computer, "03" indicates laptop computer, "04" indicates desktop computer, etc. The fourteenth bytes (with function column of "C") could be utilized to indicate the capability of the network connection. For example, "0" indicates not having the capability of making a network connection, "1" indicates having the capability of making a network connection. The fifteenth bytes (with function column of "D") could be utilized to indicate the power mode. For example, "0" indicates battery (or DC power), "1" indicates AC power. The sixteenth bytes (with function column of "E") could be utilized to indicate the status of the battery. For example, "0" indicates low power and "9" indicates full power. The eighteenth to thirty-second bytes (with function column of "F") could be utilized to indicate the basic service set identifier (BSSID) of the device name or the mac address. The seventh and the seventeenth bytes (with function column of "–") could be utilized for the separation of the symbol.

Therefore, with the SSID of Table 1, it can be known that the SSID "246824" of the electronic device 100 indicates that the communication protocol type is file swap, the device type is a desktop computer with the capability of network connection, the power mode is AC power, the battery status is minimum (if the power mode of the device is AC power, then the battery status could be a negative value or meaningless, but it is not limited thereto), and the device name is "135791357913579". There could be various amendments to the lengths of the SSID and the arrangement of each column, but it is not limited thereto. According to the embodiment of the present invention, when the control circuitry 102 calculates the weighting value according to the SSID, different functions could have different weighting impact. Specifically, the function of the Table 1 includes the device type, the capability of network connection, the power mode and the battery status. The function that is more important for the performance could have a higher weighting. For example, in one embodiment, the weighting of the functions listed in sequence from high to low are the device type (marked as "B"), the capability of the network connection (marked as "C"), the power mode (marked as "D") and the battery status (marked as "E"). In this embodiment, the twelvth to sixteenth bytes (with function column of "BCCDE" respectively) of the SSID of Table 1 could be utilized to calculate the weighting value, and its calculation method could be summing up the byte value of the twelvth byte multiplied by 10000, the byte value of the thirteenth byte multiplied by 1000, the byte value of the fourteenth byte multiplied by 100, the byte value of the fifteenth byte multiplied by 10 and the byte value of the sixteenth byte multiplied by 1, and the weighting value of 10410 may be obtained. However, the method to calculate the weighting could have various amendments and is not limited thereto.

Figure 3:
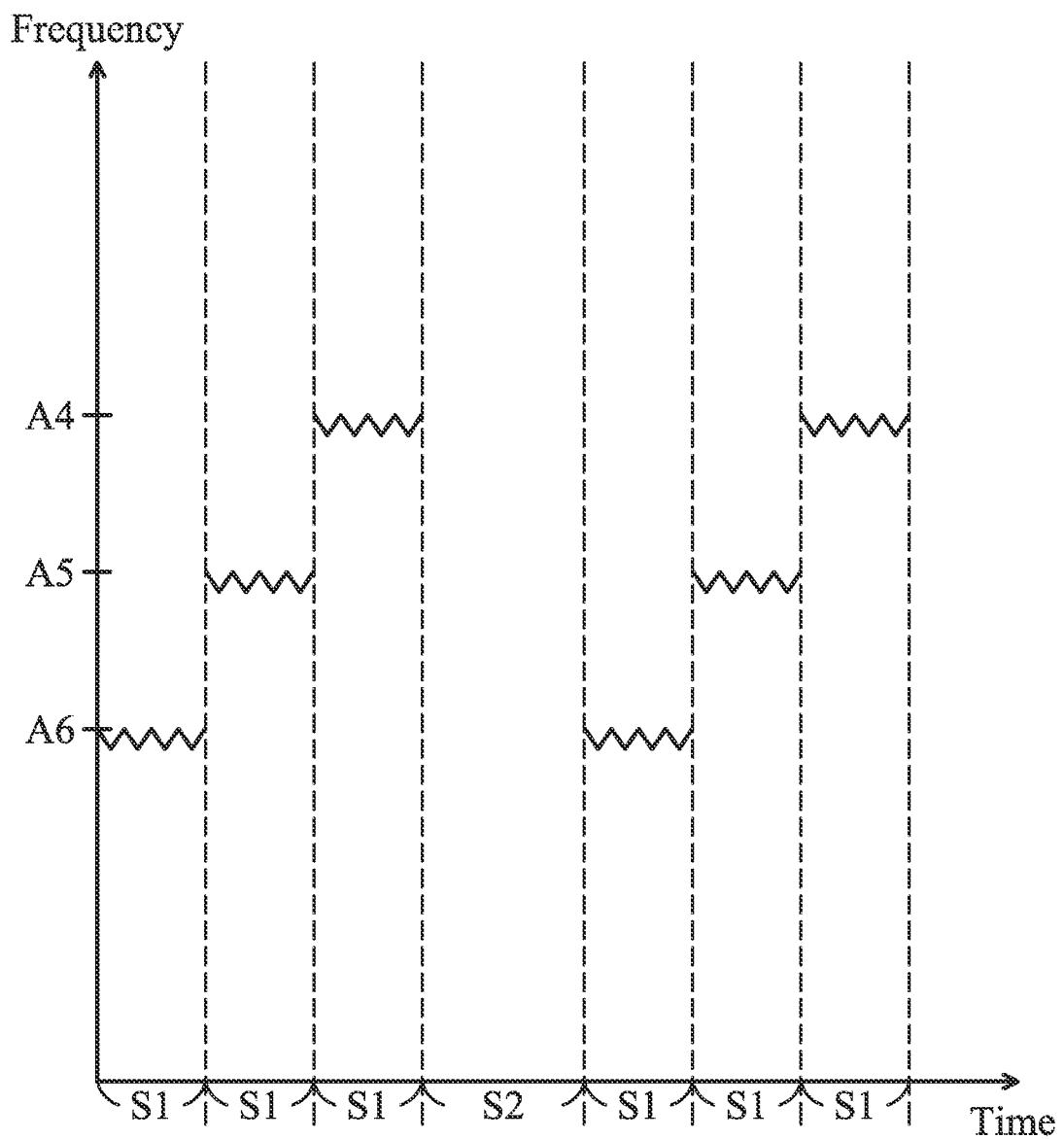
FIG. 3 is a schematic diagram of the transmission of identification sounds in sequence according to frequencies of the present invention.

FIG. 3 is a schematic diagram of transmitting identification sounds in sequence according to frequencies of the present invention. As shown in FIG.3, the audio transmission circuitry 104 transmits the first identification sound in sequence at the sub-frequency band A6, A5 and A4 according to the frequency. The transmission time at each of the sub-frequency band A6, A5 and A4 is a pre-determined transmission time S1. Afterwards, within a pre-determined hearing time S2 generated randomly, at least one second identification time transmitted by at least one second electronic device 160 is received. In one embodiment, the pre-determined transmission time is about 69 mini-second, and the range of the pre-determined hearing time is about 207 mini-second to 300 mini-second. The predetermined hearing time S2 is controlled and randomly generated by the control circuitry 102. It should be noted that when the audio receiving circuitry 106 receives the second identification sound transmitted from the second electronic device 160, if the audio transmission circuitry 104 also transmits the first identification sound, then the audio receiving circuitry 106 and the audio transmission circuitry 104 could interfere or disturb each other so that the transmission or the receiving of the identification sound may not be correct. Therefore, within the pre-determined hearing time, the first electronic device is utilized to receive the second identification sound transmitted from the second electronic device 160 and not to transmit the first identification sound.

There may be some sounds belonging to a frequency of 18000 Hz to 20000 Hz at the surrounding environment of the electronic device. In order not to mix the identification sound and the sound of the environment and not to result in an incorrect determination of the electronic device, the audio transmission circuitry 104 transmits the first identification sound in sequence at the sub-frequency band A6, A5 and A4 according to the frequency. The sound of the environment which is randomly generated could be distinguished by the pre-determined frequency range and the pre-determined transmission time. Therefore, the sequence transmission of the first identification sound at the sub-frequency band A6, A5 and A4 as shown in FIG. 3 is for illustration, and should not be limited thereto. Any method about transmitting the identification sound with a pre-determined frequency range and a pre-determined transmission time is not beyond the scope of the present invention.

Figure 4A:
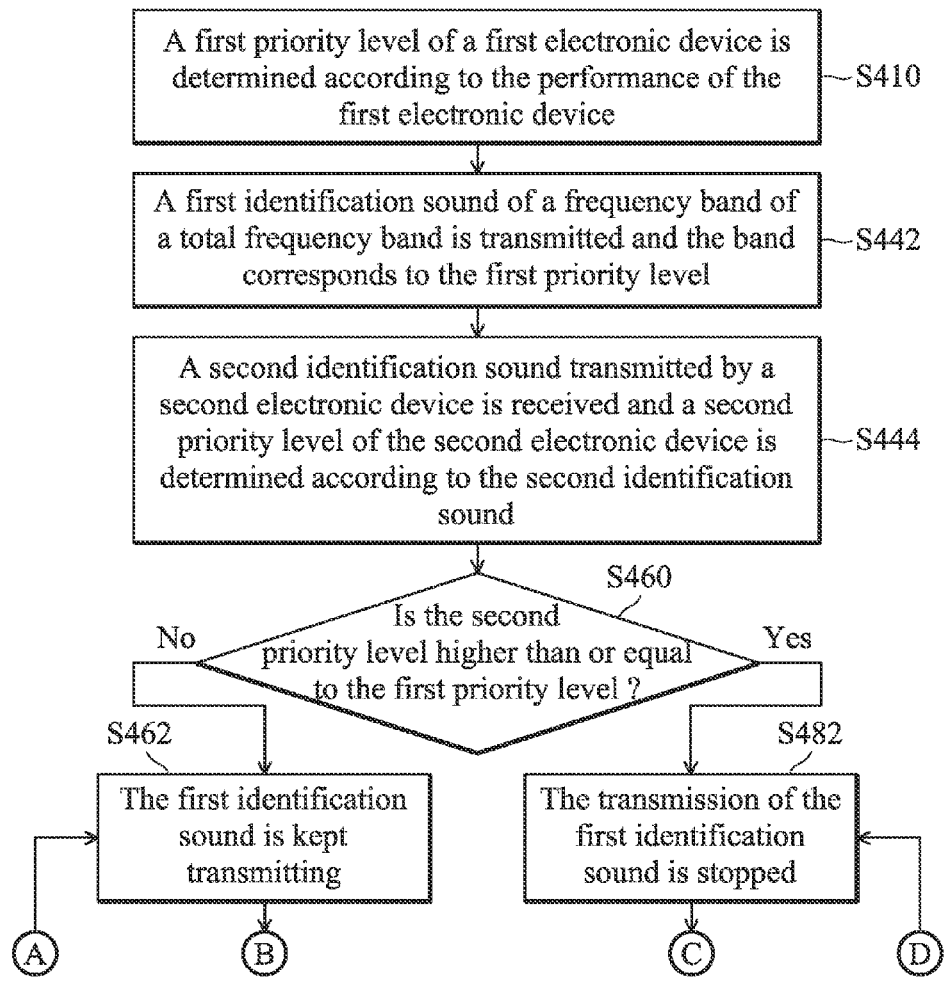
FIGS. 4A and 4B are schematic diagrams of the wireless communication method of the present invention.
Figure 4B:
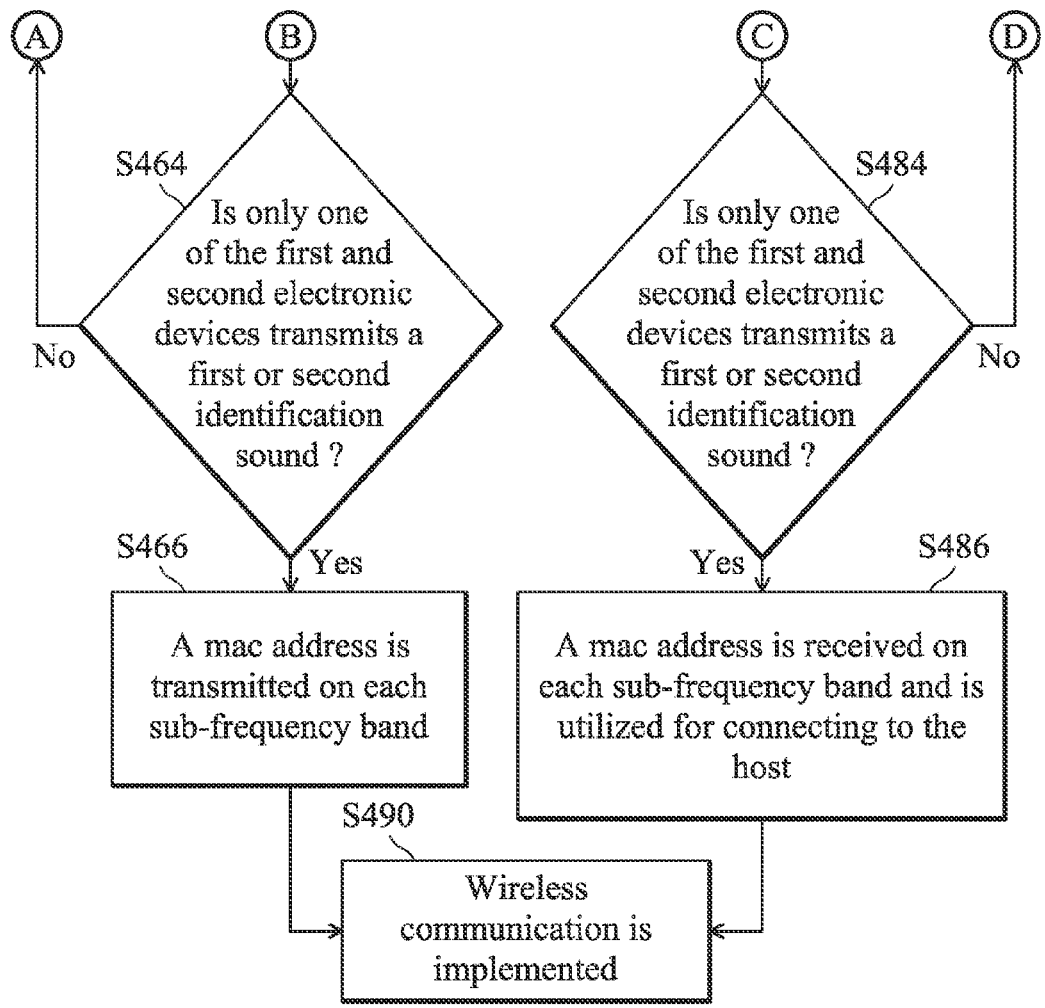

FIGS. 4A & 4B are schematic diagrams of the wireless communication method of the present invention. In step S410, the control circuitry 102 determines a first priority level of a first electronic device 100 according to the performance of the first electronic device 100. Afterwards, in step S442, the audio transmission circuitry 104 transmits the first identification sound of a frequency band of a total frequency band and the band corresponds to the first priority level. In step S444, the audio receiving circuitry 106 receives the second identification sound transmitted by the second electronic device 160 and determines the second priority level of the second electronic device according to the second identification sound. Afterwards, in step S460, the control circuitry 102 determines whether the second priority level is higher than or equal to the first priority level. If the second priority level is higher than or equal to the first priority level, then step S482 is performed. If the second priority level is not higher than or equal to the first priority level, then step S462 is performed.

In step S462, the audio transmission circuitry 104 keeps transmitting the first identification sound. Afterwards, in step 464, the control circuitry 102 determines whether only one of the first electronic device 100 and the second electronic device 160 transmits the first identification sound or the second identification sound. If not only one of the first electronic device 100 and the second electronic device 160 transmits the first identification sound or the second identification sound, then step S462 is performed. If only one of the first electronic device 100 and the second electronic device 160 transmits the first identification sound or the second identification sound, then step S466 is performed. In step S466, the connection circuitry 108 transmits the mac address on each sub-frequency band. Afterwards, in step S490, Wireless communication is implemented by the connection circuitry 108.

In step S482, the audio transmission circuitry 104 stops the transmission of the first identification sound. Afterwards, in step S484, the control circuitry 102 determines whether only one of the first electronic device 100 or the second electronic device 160 transmits the first identification sound or the second identification sound. If not only one of the first electronic device 100 and the second electronic device 160 transmits the first identification sound or the second identification sound, then step S482 is performed. If only one of the first electronic device 100 and the second electronic device 160 transmits the first identification sound or the second identification sound, then step S486 is performed. In step S486, the connection circuitry 108 transmits the mac address on each sub-frequency band and utilizes the mac address for connecting to the host. Afterwards, in step S490, Wireless communication is implemented by the connection circuitry 108.

Figure 5A:
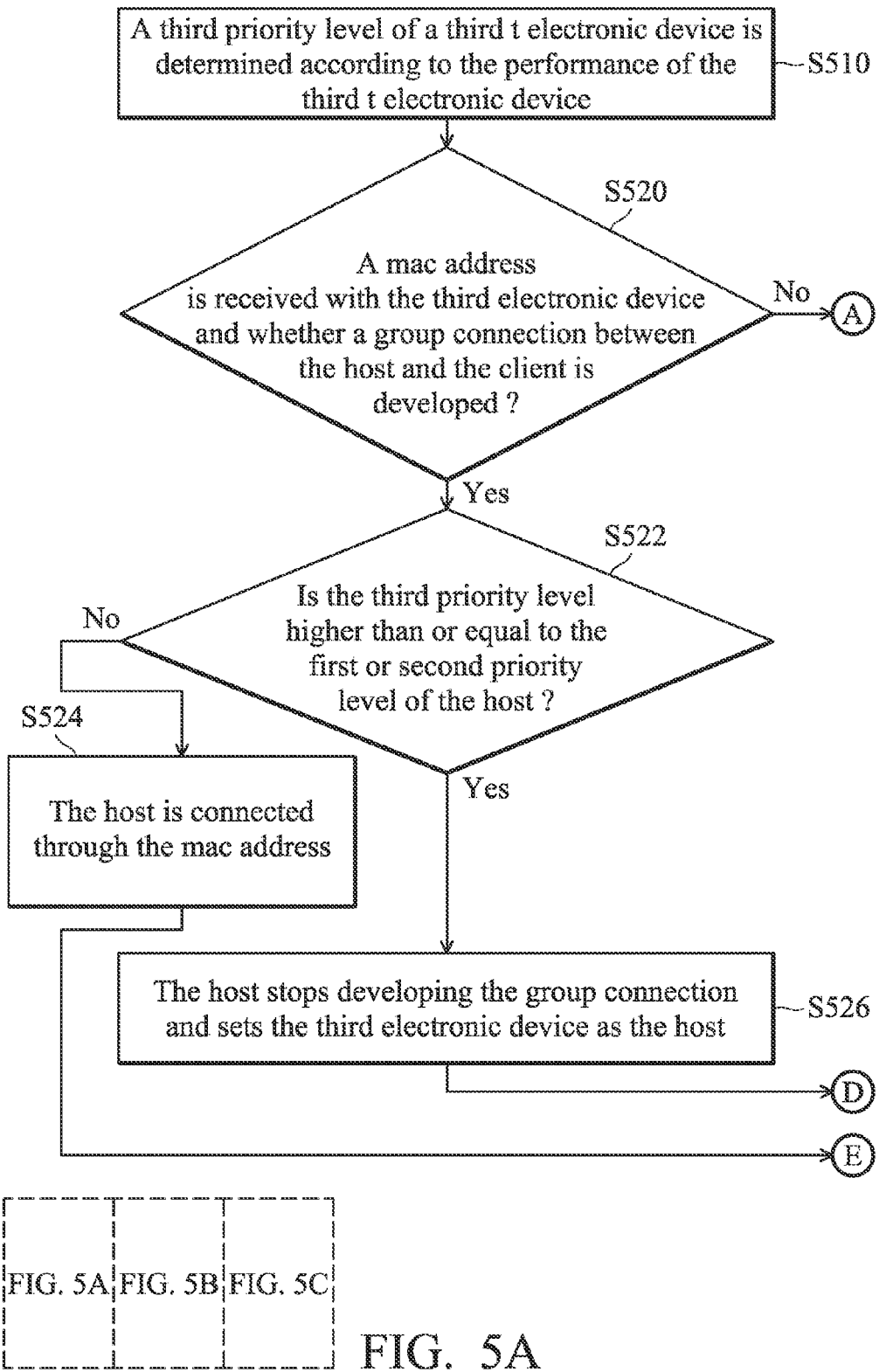
FIGS. 5A, 5B and 5C are schematic diagrams of another wireless communication method of the present invention.
Figure 5B:
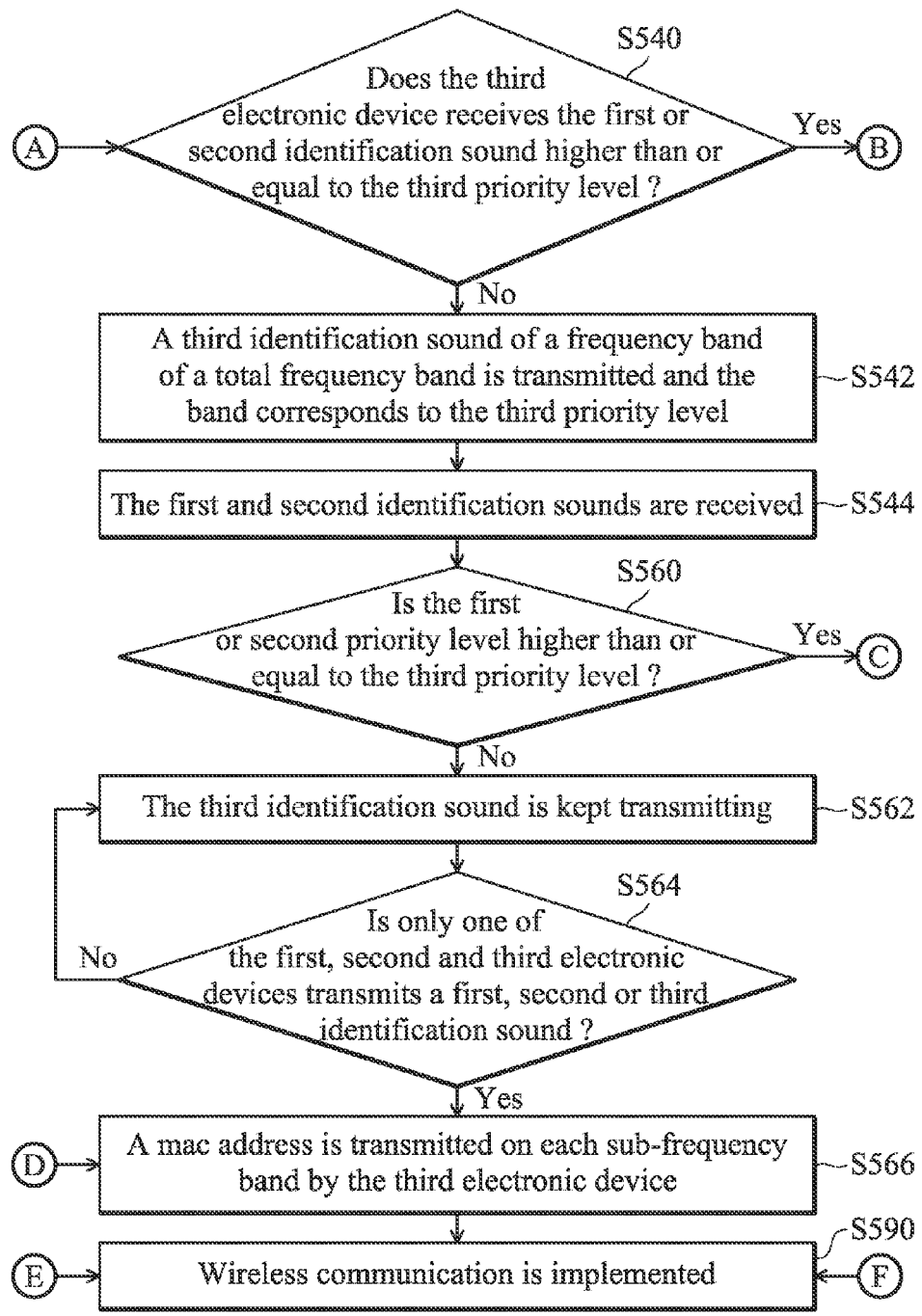
Figure 5C:
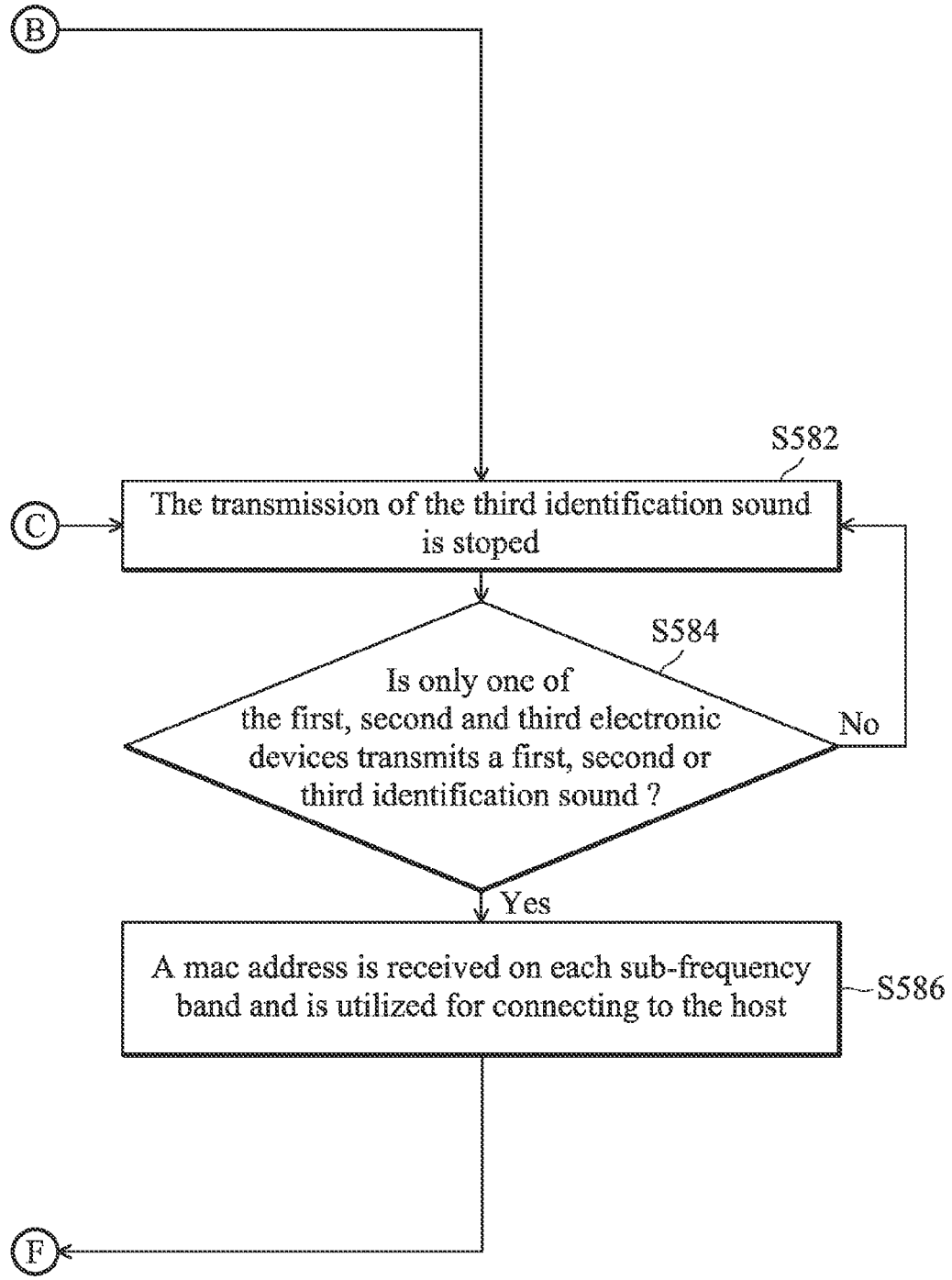

FIGS. 5A, 5B and 5C are schematic diagrams of another wireless communication method of the present invention. In step S510, A third priority level of a third electronic device is determined according to the performance of the third electronic device. In this embodiment, the first electronic device could regard the third electronic device as another external electronic device. Afterwards, in step S520, the mac address is received with the third electronic device and whether a group connection between the host and the client is developed. If the group connection between the host and the client is not developed, then step S540 is performed. If the group connection between the host and the client is developed, then step S522 is performed. In step S522, the third electronic device determines whether the third priority level is higher than or equal to the first priority level or the second priority level of the host.

If the third priority level is higher than or equal to the first priority level or the second priority level of the host, then step S526 is performed so that the host stops developing the group connection and sets the third electronic device as the host. Afterwards, step S566 is performed so that the mac address is transmitted on each sub-frequency band by the third electronic device. If the third priority level is not higher than or equal to the first priority level or the second priority level of the host, then step S524 is performed so that the third electronic device connects to the host through the mac address. Afterwards, in step S590, wireless communication is implemented by the third electronic device.

In Step 540, whether the third electronic device receives a first or second identification sound that is higher than or equal to the third priority level is determined If the third electronic device receives the first or second identification sound that is higher than or equal to the third priority level, then step S582 is performed so that the transmission of the third identification sound is stopped by the third electronic device. Afterwards, step S584 is performed so that whether only one of the first electronic device, the second electronic device or the third electronic devices transmits the first identification sound, the second identification sound or the third identification sound is determined. If not only one of the first electronic device, the second electronic device and the third electronic devices transmits the first identification sound, the second identification sound or the third identification sound, then step S582 is performed. If only one of the first electronic device, the second electronic device or the third electronic device transmits the first identification sound, the second identification sound or the third identification sound, then step S586 is performed. In step S586, the mac address is received on each sub-frequency band by the third electronic device and the third electronic device connects to the host through the mac address. Afterwards, in step S590, wireless communication is implemented by the third electronic device.

On the other hand, in step S540, if the third electronic device does not receive the first identification sound or the second identification sound higher than or equal to the third priority level, then step S542 is performed that the third identification sound of a frequency band of a total frequency band is transmitted by the third electronic device and the band corresponds to the third priority level. Afterwards, in step S544, the first identification sound and the second identification sound are received by the third electronic device. Afterwards, in step S560, the third electronic device determines whether the first priority level or the second priority level is higher than or equal to the third priority level. If the first priority level or the second priority level is higher than or equal to the third priority level, then step S582 is performed. If the first priority level or the second priority level is not higher than or equal to the third priority level, then step S562 is performed that the third identification sound is kept transmitting by the third electronic device. Afterwards, step S564 is performed that whether only one of the first electronic device, the second electronic device and the third electronic device transmits the first identification sound, the second identification sound or the third identification sound is determined If not only one of the first electronic device, the second electronic device and the third electronic device transmits the first identification sound, the second identification sound or the third identification sound, then step S562 is performed. If only one of the first electronic device, the second electronic device and the third electronic device transmits the first identification sound, the second identification sound or the third identification sound, then step S566 is performed that the mac address is transmitted on each sub-frequency band by the third electronic device. Afterwards, in step S590, wireless communication is implemented by the third electronic device.

The present invention provides a method of wireless network connection. By transmitting the sounds of 18000 Hz to 20000 Hz which cannot be heard by most people, a plurality of electronic devices could determine the electronic device with the best performance among them to become the host, and the host initiates the software AP for connecting to the wireless network. Other non-host electronic devices are clients and connect to the wireless network through the host. Therefore, the wireless network connection method of the present invention solves the problems of finding the electronic device with the best performance and proceeding to the wireless network by the users, and the users could establish the wireless network connection and share data more easily.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless network communication method, utilized for a first electronic device, comprising:
    determining a first priority level of the first electronic device according to a performance of the first electronic device;
    dividing a total frequency band into at least one band and determining one of the at least one band that corresponds to the first priority level;
    transmitting a first identification sound corresponding to the band;
    receiving a second identification sound transmitted by a second electronic device;
    comparing a second priority level and the first priority level, wherein the second priority level is according to the second identification sound;
    stopping transmission of the first identification sound when the second priority level is higher than or equal to the first priority level; and
    keeping transmission of the first identification sound until a host is set to implement a wireless network communication when the second priority level is lower than the first priority level.

2. The wireless network communication method as claimed in claim 1, further comprising when only one of the first electronic device or the second electronic device transmits the first identification sound or the second identification sound, setting the one transmitting the first identification sound or the second identification sound as the host, and setting the one not transmitting the first identification sound or the second identification sound as a client which connects to a wireless network through the host.

3. The wireless network communication method as claimed in claim 1, wherein in the step of transmitting the first identification sound of the band corresponding to the first priority level, the band includes three sub-frequency bands, and the first identification sound of each sub-frequency band is transmitted in sequence according to the frequency, and a transmission time of each sub-frequency band is a pre-determined transmission time.

4. The wireless network communication method as claimed in claim 3, wherein a range of the total frequency band is about 18000 Hz to 20000 Hz, and a bandwidth of the sub-frequency band is about 100 Hz.

5. The wireless network communication method as claimed in claim 3, wherein the step of receiving the second identification sound transmitted by the second electronic device is implemented within a pre-determined hearing time which is randomly generated.

6. The wireless network communication method as claimed in claim 5, wherein the pre-determined transmission time is about 69 mini-second and the pre-determined hearing time is about 207 mini-second to 300 mini-second.

7. The wireless network communication method as claimed in claim 2, further comprising after the step of setting the one transmitting the first identification sound or the second identification sound as the host, transmitting a media access control (MAC) address on each sub-frequency band to the client by the host for developing a group connection between the host and the client.

8. The wireless network communication method as claimed in claim 7, after the step of developing the group connection between the host and the client, further comprising:
    receiving the mac address by a third electronic device;
    determining whether the group connection between the host and the client is developed;
    comparing a third priority level of the third electronic device and the first priority level or the second priority level of the host when the group connection between the host and the client is developed; and
    determining whether the third electronic device receives the first identification sound or the second identification sound higher than or equal to the third priority level when the group connection between the host and the client is not developed.

9. The wireless network communication method as claimed in claim 8, further comprising after the step of comparing a third priority level and the first priority level or the second priority level of the host, stopping developing the group connection and setting the third electronic device as a new host by the host.

10. The wireless network communication method as claimed in claim 1, wherein the first identification sound includes a service set identifier to identify performance of the first electronic device, and the performance of the first electronic device includes communication protocol type, network connection capability, device type, power mode and/or battery status.

11. An electronic device, utilized for wireless network communication, comprising:
    a control circuitry, utilized to determine a first priority level of the electronic device according to a performance of the electronic device, divide a total frequency band into at least one band and determine one of the at least one band that corresponds to the first priority level;

an audio transmission circuitry, utilized to transmit a first identification sound corresponding to the band;

an audio receiving circuitry, utilized to receive a second identification sound transmitted by a first external electronic device; and a connection circuitry;

wherein the control circuitry determines a second priority level of the first external electronic device according to the second identification sound, compares the second priority level and the first priority level, stops transmission of the first identification sound when the second priority level is higher than or equal to the first priority level, and keeps transmission of the first identification sound until a host is set to implement a wireless network communication when the second priority level is lower than the first priority level.

12. The electronic device as claimed in claim 11, wherein when only one of the first electronic device and the first external electronic device transmits the first identification sound or the second identification sound, the control circuitry sets the one transmitting the first identification sound or the second identification sound as the host, and sets the one not transmitting the first identification sound or the second identification sound as a client which connects to a wireless network through the host.

13. The electronic device as claimed in claim 11, wherein the band includes three sub-frequency bands, and the first identification sound of each sub-frequency band is transmitted in sequence according to the frequency, and a transmission time of each sub-frequency band is a pre-determined transmission time.

14. The electronic device as claimed in claim 12, wherein after the control circuitry sets the one transmitting the first identification sound or the second identification sound as the host, the connection circuitry transmits a mac address on each sub-frequency band to the client for developing a group connection between the host and the client.

15. The electronic device as claimed in claim 14, wherein when a second external electronic device receives the mac address, the second electronic device determines whether the group connection between the host and the client is developed, and compares a third priority level of the second external electronic device and the first priority level or the second priority level of the host when the group connection between the host and the client is developed.

16. The electronic device as claimed in claim 15, wherein whether the second external electronic device receives the first identification sound or the second identification sound higher than or equal to the third priority level when the group connection between the host and the client is not developed, and the host stops developing the group connection and sets the second external electronic device as a new host when the third priority level is higher than or equal to the first priority level or the second priority level of the host.

17. The electronic device as claimed in claim 11, wherein the first identification sound includes a service set identifier to identify performance of the first electronic device, and the performance of the first electronic device includes communication protocol type, network connection capability, device type, power mode and/or battery status.

* * * * *